(12) United States Patent
Watanabe et al.

(10) Patent No.: US 9,117,478 B2
(45) Date of Patent: Aug. 25, 2015

(54) PATTERN FORMING METHOD, METHOD OF MANUFACTURING MAGNETIC RECORDING MEDIUM AND MAGNETIC RECORDING MEDIUM

(71) Applicant: KABUSHIKI KAISHA TOSHIBA, Tokyo (JP)

(72) Inventors: Akira Watanabe, Kanagawa (JP); Katsuya Sugawara, Kanagawa (JP); Kazutaka Takizawa, Kanagawa (JP); Kaori Kimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/194,458

(22) Filed: Feb. 28, 2014

(65) Prior Publication Data

US 2015/0069010 A1    Mar. 12, 2015

(30) Foreign Application Priority Data

Sep. 9, 2013    (JP) .................................. 2013-186547

(51) Int. Cl.
| | | |
|---|---|---|
| *B44C 1/22* | (2006.01) | |
| *C03C 15/00* | (2006.01) | |
| *C03C 25/68* | (2006.01) | |
| *C23F 1/00* | (2006.01) | |
| *G11B 5/84* | (2006.01) | |
| *G11B 5/855* | (2006.01) | |

(52) U.S. Cl.
CPC . *G11B 5/84* (2013.01); *G11B 5/855* (2013.01)

(58) Field of Classification Search
USPC .......................................................... 216/41
See application file for complete search history.

(56) References Cited

U.S. PATENT DOCUMENTS

2008/0193658 A1 *    8/2008    Millward ...................... 427/401

FOREIGN PATENT DOCUMENTS

JP    2004303870 A    10/2004

OTHER PUBLICATIONS

Nathanael L. Y. Wu et al., Density Doubling of Block Copolymer Templated Features, Nano Letters, 2012, 12, 264-268, ACS Publications.

* cited by examiner

*Primary Examiner* — Roberts Culbert
(74) *Attorney, Agent, or Firm* — Patterson & Sheridan, LLP

(57) ABSTRACT

A patterning method includes steps of forming a first copolymer layer comprising a first diblock copolymer which has portions which are phase incompatible. The first copolymer layer is annealed to form a first phase pattern including a first phase dispersed in a second surrounding phase. The first copolymer is then etched forming a first topographic pattern that corresponds to the first phase pattern. A second copolymer layer of a second diblock copolymer is then formed over the first topographic pattern, and then annealed to generate a second phase pattern offset from the first topographic pattern. Etching is used to form a second topographic pattern corresponding to the second phase pattern. The first and second topographic patterns are then transferred to the substrate. The patterning method can be used, for example, to form patterned recording layers for magnetic storage devices.

20 Claims, 8 Drawing Sheets

PATTERN FORMING METHOD, METHOD OF MANUFACTURING MAGNETIC RECORDING MEDIUM AND MAGNETIC RECORDING MEDIUM

CROSS-REFERENCE TO RELATED APPLICATION

This application is based upon and claims the benefit of priority from Japanese Patent Application No. 2013-186547, filed Sep. 9, 2013, the entire contents of which are incorporated herein by reference.

FIELD

Embodiments described herein relate generally to a pattern forming method and a method of manufacturing a magnetic recording medium.

BACKGROUND

A fine patterning on a surface may be performed when fabricating a hard disk drive medium, forming an antireflection film, providing a catalytic surface, and manufacturing a microchip, an optical device, or semiconductor device.

Patterned media for use in hard disk drives have been proposed for achieving a high recording density in magnetic storage devices. This patterning of the hard disk media (e.g., disk drive platters) to increase the storage density produces so called "bit patterned media" (BPM). By patterning a recording layer surface of a hard disk medium to have a fine uneven shape, a patterned medium can be obtained. In patterned media, the method used for forming a patterning mask is an important issue. It is known in the art that it is possible to use a self-assembly process to produce a periodic patterning mask.

A self-assembled lithography process using a diblock copolymer is a method that can produce a pattern with features from several nanometers (nm) to several tens of nm at a relatively low cost by using a microphase separation technique (generating phase-separated lamella, cylinders, sphere structures, or the like) using an annealing of a diblock copolymer. The finer the pattern that is formed on the hard disk medium, the higher the possible recording density.

DETAILED DESCRIPTION

An exemplary embodiment provides a fine pattern having a high density by using a self-assembled film.

In general, according to one embodiment, there is provided a patterning method including forming a first copolymer layer on a substrate having a processing layer. The first copolymer layer comprises a first diblock copolymer including two polymeric portions which are phase incompatible with each other. The first copolymer layer is then annealed to generate a first phase pattern. The first phase pattern includes a first dispersed phase and a first continuous phase that surrounds the first dispersed phase. The first dispersed phase may comprise, for example, spheres or cylinders. A first topographic pattern corresponding to the first phase pattern is then formed by etching the first copolymer layer. A second copolymer layer is formed over the first topographic pattern. The second copolymer layer comprises a second diblock copolymer including two polymeric portions which are phase incompatible with each other. In some embodiments, the first and second diblock copolymers may comprises the same polymeric material types. A second phase pattern is generated by annealing the second copolymer layer. The second phase pattern is offset from the first topographic pattern in a direction parallel to the substrate plane. In this context, the substrate plane corresponds to a plane including an un-patterned, flat surface of the substrate upon which films are stacked. Etching of the second copolymer film forms a second topographic pattern corresponding to the second phase pattern. The first and second topographic patterns are transferred to the processing layer by, etching, ion implantation, or diffusion processes to generate a pattern in the processing layer corresponding to both the first and second topographic patterns. In some embodiments, transfer of the topographic patterns may use one or more hard mask layers formed on the substrate. In some embodiments, additional copolymer films may be formed on the substrate in a manner similar to the first and second layers to generate one or more additional topographic pattern.

Hereinafter, the embodiments will be described with reference to the drawings.

FIGS. 1A to 1G depict a pattern forming method according to a first embodiment.

Figure 1A:
FIGS. 1A to 1G are schematic diagrams representing an example of a pattern forming method.

As shown in FIG. 1A, a surface modification layer 2 (hereinafter "surface layer 2" or "layer 2" for simplicity) for adjusting a substrate surface energy is formed on a substrate 1. In this example, surface layer 2 may be a polymer layer having a desired surface energy. However, the present disclosure is not limited to specific methods and materials for forming surface layer as long as the surface energy of the substrate 1 is controlled as required. For example, a method using deposition of a self-assembled monolayer (SAM) film of low molecular weight polymer can be adopted for providing the desired surface energy. A method whereby the surface energy of substrate 1 is controlled via ion injection of metals or other materials such as semiconductors into the surface of substrate 1 can also be adopted.

Figure 1B:
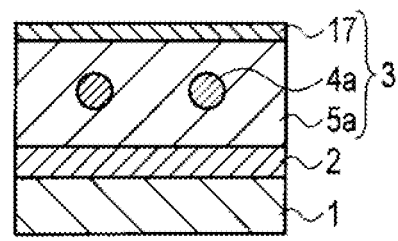

Then, as shown in FIG. 1B, a first coating solution containing the first diblock copolymer comprising a first block portion of polymer A (polymer chain A) and a second block portion of polymer B (polymer chain B) is prepared. The first diblock copolymer coating solution is coated onto the surface layer 2 and dries to form a first diblock copolymer layer 3. Thereafter, first diblock copolymer layer 3 is subjected to a thermal annealing or a solvent annealing process.

A solvent annealing process may involve exposing first diblock copolymer layer 3 to a solvent in which both polymer A and B are at least partially soluble, or a solvent in which only one of A and B are at least partially soluble. The annealing process promotes the separation of first diblock copolymer layer 3 into two separate phases (i.e., a polymer A phase and a polymer B phase).

Once first diblock copolymer layer 3 experiences phase separation a dispersed (island-shaped) polymer phase 4a (hereinafter, "dispersed phase 4a" or "phase 4a" for simplicity) and a continuous polymer phase 5a (hereinafter, "continuous phase 5a" or "phase 5a" for simplicity), which surrounds phase 4a, are formed. Phase 4a may comprise either of polymer chain A or polymer chain B. Phase 5a may comprise the other polymer chain not comprising phase 4a.

In addition to phase 4a and phase 5a, an uppermost surface phase 17 (hereinafter "surface phase 17" or "phase 17" for simplicity) is formed of the polymer chain (A or B) having the lower surface energy of polymer chain A and polymer chain B forms on the uppermost surface. If the surface phase 17 formed on the outermost surface comprises the same polymer phase 5a, the surface phase 17 and phase 5a, the two depicted phases (5a and 17) may be the same phase. That is, surface phase 17 need not be distinct from phase 5a under these circumstances.

Figure 1C:
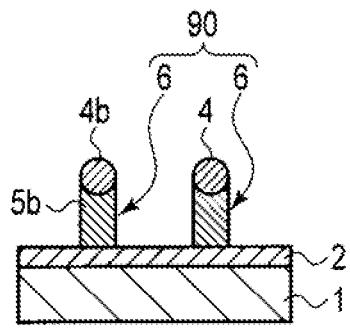

Subsequently, as shown in FIG. 1C, the surface phase 17 and the phase 5a are etched and a first pattern 6 formed of a dispersed phase 4b (formed when phase 4a is exposed to the etching process) and a phase 5b (formed by etching phase 5a to remove portions of phase 5a that are not under portions of phase 4a/4b) is formed on the substrate 1.

Figure 1D:
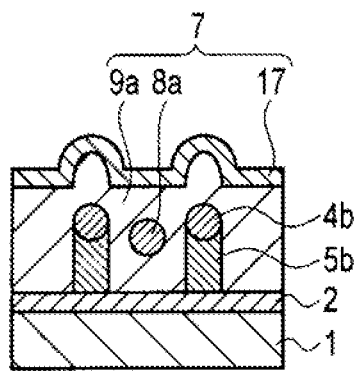

Furthermore, as shown in FIG. 1D, a second coating solution is prepared using a second diblock copolymer formed of the same materials as the first diblock copolymer and the coating solution is coated onto the first pattern 6 (comprising phase 4b and phase 5b) and then dried to form a second diblock copolymer layer 7.

As shown in the drawing, the second diblock copolymer layer 7 is subjected to a thermal annealing process or a solvent annealing process and the polymer chain A and the polymer chain B are thus phase-separated. Accordingly, in the second diblock copolymer layer 7, a two phase system (a sea-island phase) is formed comprising of an dispersed (island-shaped) polymer phase 8a (hereinafter, "dispersed phase 8a" or "phase 8a" for simplicity) formed primarily by one of polymer chain A and polymer chain B and dispersed in a continuous (sea-shaped) polymer phase 9a (hereinafter, "continuous phase 9a" or "phase 9a" for simplicity) formed by the other of polymer chain A and polymer chain B. The continuous phase 9a surrounds the dispersed phase 8a. Surface phase 17 is formed of the polymer chain A or B having the lower energy on the uppermost surface of the second diblock copolymer layer 7.

Figure 1E:
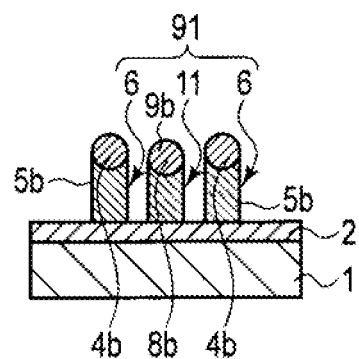

Subsequently, as shown in FIG. 1E, the surface phase 17 and the phase 9a are etched to form a second pattern 11, comprising a dispersed phase 8b and a phase 9b (each of phase 8b and 9b modified by the etching process), is formed on the substrate 1. The combined pattern density of pattern 6 and pattern 11 creates a high density pattern 91. Pattern 91 has double the density of the first pattern 6 alone.

Figure 1F:
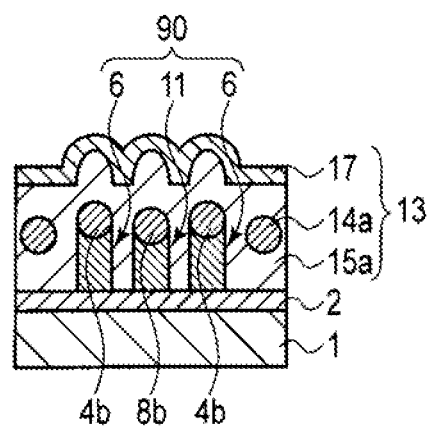

Furthermore, if necessary, as shown in FIG. 1F, a third coating solution may be prepared using a third diblock copolymer formed of the same material as the first diblock copolymer. The third coating solution is coated over the first pattern 6 and second pattern 11 (together comprising combined pattern 91) and then dried to form a third diblock copolymer layer 13.

The third diblock copolymer layer 13 is subjected to a thermal annealing process or a solvent annealing process, and the polymer chain A and the polymer chain B are phase-separated. Accordingly, in the third diblock copolymer layer 13, a "sea-island phase" (dispersed-continuous phase) which is formed of a dispersed phase 14a formed primarily by one the polymer chain A and the polymer chain B, and a continuous phase 15a formed by the other of the polymer chain A and the polymer chain B that is not the primary component of phase 14a.

The dispersed-continuous phase pattern of the third diblock polymer may have nominally the same shape and pitch as the first and the second diblock copolymer. Continuous phase 15a surrounds the dispersed phase 14a. A surface phase 17, comprising a polymer chain (A or B) having the lower energy, is formed on the uppermost surface.

The surface phase 17 and a phase 15a are etched to form a third pattern 16 comprising the dispersed phase 14b and the phase 15b on the substrate 1. The high-density pattern 92 is formed by the combination of the first pattern 6, the second pattern 11, and the third pattern 16. The density of pattern 92 is three times the density of the first pattern 6 alone.

By repeating coating and etching three times, it is possible to form the high density pattern 92 having three times the density of a pattern formed using only one layer of a diblock copolymer.

In a phase separation step, a thermal annealing process which heats a copolymer layer in vacuum or an inert gas atmosphere or a solvent annealing process in which a copolymer layer is placed in a solvent atmosphere is performed. In solvent annealing, it is necessary that glass transition temperature of diblock copolymer be below the temperature at which a phase separation occurs.

Generally, it is possible to select a solvent which has an affinity for both the polymer of the polymer chain A and the polymer chain B of a diblock copolymer and which thus dissolves both polymer chain A and polymer chain B. However, with a diblock copolymer in which the glass transition temperature of the polymer chain A or the polymer chain B is sufficiently lower than the temperature at which phase separation occurs, or similarly if a molecular weight of the polymer chain A or the polymer chain B is extremely low, a solvent which has an affinity for only one of the polymer chain A or polymer chain B can be used.

If a solvent which dissolves only one is used, an apparent self-interaction parameter ($\chi$) between polymer chains A and the polymer chain B becomes great and it is possible to obtain a narrower phase separation structure than with use of the thermal annealing process.

As a diblock copolymer, polystyrene-polydimethylsiloxane (PS-PDMS) can be used.

By using PDMS, which contains silicon (Si) in its backbone, it is possible to improve a masking resistance to certain etching processes. Furthermore, while the glass transition temperature of PDMS depends on molecular weight, if the molecular weight is about 3,000, the glass transition temperature is as low as −127° C., thus if the solvent annealing is performed, a solvent which dissolves only PS can be selected.

Furthermore, by transferring each pattern formed by a diblock copolymer to a hard mask, by forming a diblock copolymer coating film and then performing etching of the hard mask layer, the change in shape of a pattern finally formed on a substrate can be reduced.

A laminated mask of carbon and silicon can be used as the hard mask. Particularly, if using the PS-PDMS in which PS becomes a continuous phase as a diblock copolymer, since the layer structure of a pattern formed by the hard mask and a diblock copolymer is the same component, when the pattern transfer by etching is performed, change in pattern shape can be reduced.

Moreover, the shape of the dispersed phase referred to herein includes a sphere and a cylinder. If the shape is a cylinder, the center axis is preferably substantially perpendicular with respect to the in-plane direction of the layer to be processed in a BPM fabrication process.

A pattern forming method according to the embodiments can be applied to patterning of a magnetic recording medium.

A method for manufacturing a magnetic recording medium includes a step of forming a magnetic recording layer on a substrate, a step of forming a mask layer on the magnetic recording layer, a step of forming a pattern on the mask layer, a step of transferring the pattern to the mask layer, a step of etching the magnetic recording layer through the mask layer having the pattern and a step of removing the mask layer.

The step of forming a pattern on the mask layer includes a step in which a first diblock copolymer layer having two types of polymer blocks that are phase incompatible with each other is formed on the mask layer. The pattern is formed by the first dispersed phase and the first continuous phase, which surrounds the first dispersed phase, generated by phase separation of the first diblock copolymer layer.

Etching of the first continuous phase using the first dispersed phase as a mask is performed and the first pattern is formed on the mask layer to be processed.

A step in which a second diblock copolymer layer is formed over the first patterned layer is then performed. The second diblock copolymer layer forms a second pattern of second dispersed phase and a second continuous phase upon phase separation. The second dispersed phase, which is in a position different (offset) from the first dispersed phase, and the continuous second phase, which surrounds the second dispersed phase form the second pattern forms the second pattern.

Etching of the second phase pattern using the second dispersed phase as a mask is performed and the second pattern is formed in addition to the first pattern already formed. Thus, a combined pattern having a higher density than the first pattern's density is formed. The first and second patterns can be said to be "topographic" patterns as they comprise portions with different heights (e.g., etched portions and un-etched portions).

By patterning a magnetic recording medium in this described manner, a magnetic recording medium having a high density more than 1 Tbpsi (terabits per square inch) can be produced.

As diblock copolymer forming a microphase separation shape, for example, polybutadiene-block-polydimethylsiloxane, polybutadiene-block-poly-4-vinylpyridine, polybutadiene-block-poly-methyl methacrylate, polybutadiene-block-poly-t-butyl methacrylate, polybutadiene-block-poly-t-butyl acrylate, polybutadiene-block-sodium polyacrylate, polybutadiene-block-polyethylene oxide, poly-t-butyl methacrylate-block-poly-4-vinylpyridine, polyethylene-block-poly-methyl methacrylate, poly-t-butylmethacrylate-block-poly-2-vinylpyridine, polyethylene-block-poly-2-vinylpyridine, polyethylene-block-poly-4-vinylpyridine, polyisoprene-block-poly-2-vinylpyridine, poly-t-butyl methacrylate-block-polystyrene, poly methyl acrylate-block-polystyrene, polybutadiene-block-polystyrene, polyisoprene-block-polystyrene, polystyrene-block-poly-2-vinylpyridine, polystyrene-block-poly-4-vinylpyridine, polystyrene-block-polydimethyl siloxane, polystyrene-block-poly-N,N-dimethyl acrylamide, polystyrene-block-polyethylene oxide, polystyrene-block-polysilsesquioxanes, poly-methyl methacrylate-block-polysilsesquioxanes, polystyrene-block-poly-methyl methacrylate, poly-t-butyl methacrylate-block-polyethylene oxide, polystyrene-block-polyacrylic acid and the like are disclosed.

In particular, since polystyrene-block-polymethyl methacrylate, polystyrene-block-poly dimethyl siloxane, polystyrene-block-polyethylene oxide, polystyrene-block-polysilsesquioxane, polymethyl methacrylate-block-polysilsesquioxane have comparatively large interaction parameter between each polymer which is copolymerized and can form a stable phase separation shape, the above-described materials are preferred as a material used in the example embodiments.

Furthermore, since polystyrene-block-polydimethyl siloxane, polystyrene-block-polysilsesquioxane, polymethyl methacrylate-block-polysilsesquioxane contain silicon in one of block polymer components, the etching resistance in certain etches is high. In addition, a polystyrene-block-polydimethylsiloxane with a glass transition temperature of the polydimethylsiloxane being below room temperature allows narrow patterns to be formed when a solvent annealing process is used and this may be preferred in some embodiments.

A volume fraction of the polymer chain A and the polymer chain B in the diblock copolymer which is used can be adjusted such that the polymer component having a higher etching resistance forms the dispersed phase (island shape or columnar shape phase).

Specifically, if polystyrene-block-polysilsesquioxane, polymethyl methacrylate-block-polysilsesquioxane, polystyrene-block-polydimethylsiloxane are used, it is preferable that the volume fraction of polydimethylsiloxane or polysilsesquioxane, which have higher etching resistance, be 10% to 35%, and polysilsesquioxane or polydimethylsiloxane be phase-separated into the dispersed phase.

As the coating solvent for dissolving the diblock copolymer, a solvent capable of dissolving both the polymer chain A and the polymer chain B constituting the diblock copolymer is selected. For example, propyl acetate; propylene glycol-1-methyl ether acetate (PGMEA), butyl acetate, ethyl acetate, methyl acetate, toluene, anisole, cyclohexanone and the like may be selected as appropriate. In particular, PGMEA, anisole, cyclohexanone have a boiling point of about 150° C. and from the viewpoint of drying speed, these solvents are generally preferable as a coating solvent used in spin coating. Furthermore, a solvent of the embodiments is not limited to the above-described solvents as long as the solvent dissolves the diblock copolymer.

As an annealing solvent used in the phase separation step, a solvent which can decrease the glass transition temperature of the diblock copolymer may be used and if a polymer having a low glass transition temperature such as polydimethylsiloxane is included in the diblock copolymer, a solvent dissolves only the non-PDMS component polymer, such as polystyrene or polymethyl methacrylate may be used, and a solvent having high polarity, for example, N,N-dimethyl acetamide, N-methyl pyrrolidone, N,N-dimethyl formamide, benzyl alcohol, diethylene glycol can be used. Furthermore, solvents are not limited to the above-described solvents, but may be selected in view of the specific components of the diblock polymer or other processing parameters.

Relationship Between Annealing Temperature and Molecular Weight

A thermal annealing process is a step in which a sample is placed in vacuum or an inert gas, and a phase separation structure is generated by performing heat treatment. A solvent annealing process is a step in which by placing a sample in a solvent-rich atmosphere, a phase separation structure is generated.

In the thermal annealing, if the heating temperature at or above the glass transition temperature of a polymer, the transfer and the diffusion of the polymer can more easily occur to form the phase separation structure.

If the sample is placed in a solvent atmosphere, annealing solvent is incorporated into the polymer film which causes the glass transition temperature of the polymer to decrease.

When the glass transition temperature is lower than the process temperature, the transfer and the diffusion of the polymer occur to form a phase separation structure.

The time required for completing the phase separation process is correlated with the diffusion coefficients of the polymers involved. If the process temperature is the glass transition temperature or higher, the diffusion of the polymer can be considered to be approximated by the diffusion of materials in a polymer gel and the diffusion coefficient $D_0$ can be expressed in a relation of the following equation (1):

$$D_0 \propto k_B T / 6\pi M^\nu \quad \text{Equation (1)}$$

where $k_B$=Boltzmann constant, T=absolute-scale temperature, M=molecular weight, $\nu$=a constant.

The diffusion coefficient has properties that are proportional to the process temperature and is inversely proportional to the molecular weight of the polymer. For this reason, if a polymer has a large molecular weight, the diffusion coefficient is reduced and the time required for a phase separation increases. For this reason, by increasing the process temperature with respect to polymer materials having a large molecular weight, it is possible to increase the diffusion coefficient, and to solve the problem of a prolonged phase separation step.

On the other hand, in polymers having a low molecular weight, there are problems that a diffusion coefficient becomes larger than necessary, and the thin film shape formed by coating cannot be maintained as the polymer film may be unstable at elevated temperatures. In the case, by using a solvent annealing process, the process temperature may be decreased to room temperature or lower. Lowering the process temperature can reduce the diffusion coefficient of the low molecular weight polymer to improve film stability.

From experience, if a diblock copolymer having a molecular weight of 30,000 or higher, particularly, 50,000 or higher is phase-separated by solvent annealing, the process temperature is desirably set from about 50° C. to 200° C. and if a diblock copolymer having a molecular weight of 10,000 or lower, particularly, 8,000 or lower is to be phase-separated by solvent annealing, the process temperature can be set from about 0° C. to −50° C.

Furthermore, in a phase separation, it is possible to control the amount of an annealing solvent incorporated in the thin diblock copolymer film. Depending on the amount of solvent incorporated, the decrease in the glass transition temperature can be varied. The process temperature be controlled and the diffusion coefficient of the polymer adjusted depending on the amount of solvent incorporated in the diblock copolymer thin film. Furthermore, since by rapid decrease of the temperature, a particular solvent vapor pressure in a process chamber may exceed a saturated vapor pressure and cause solvent vapor to condense (on the chamber and/or the substrate), caution is required when controlling the temperature to avoid unwanted condensation.

Type of Diblock Copolymer to be Selected

As a diblock copolymer to be selected, a dot diameter after etching can be set to be less than $1/\sqrt{3}$ of the pitch.

Figure 2:
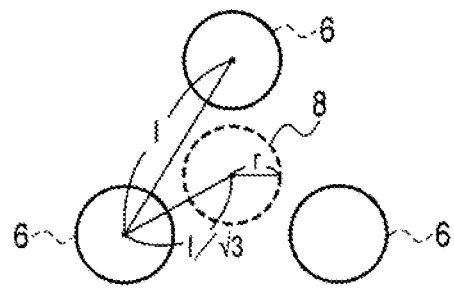
FIG. 2 depicts an arrangement of a first pattern and a second pattern.

FIG. 2 shows depicts an arrangement of the first pattern and the dispersed phase of the second diblock copolymer used in embodiments.

In forming the second diblock copolymer layer on the first pattern 6, which forms an equilateral triangle, a dispersed phase 8 of the second diblock copolymer is located in the center of an equilateral triangle of the first pattern 6 is the top. In order that the first pattern 6 and the second pattern 8 are independent on each other, the diameter of the first pattern 6 can be set to be less than $1/\sqrt{3}$ of the pitch I.

EXAMPLE 1

A pattern forming method according to a first embodiment will be described with reference to FIGS. 1A to 1G.

First Diblock Copolymer Layer Forming Step

The substrate 1 was washed for 10 minutes using a UV cleaner. PS having a terminal hydroxyl group was dissolved in a solvent and coated on the substrate by a spin coating process. Thereafter, a heat treatment (bake step) was performed at 170° C. for 20 hours under a vacuum atmosphere and a chemisorbed layer of PS was formed on the substrate 1. Thereafter, the substrate was rinsed in PGMEA, and excess PS that is not chemisorbed was thereby dissolved and the substrate was cleaned.

Thereafter, the remaining solvent was evaporated by rotary dryer and, as shown in FIG. 1A, the substrate 1 having a chemisorbed layer 2 of PS on the surface was obtained. The film thickness of the chemisorbed layer 2 can be controlled by controlling the molecular weight of PS. A chemisorbed layer 2 having a film thickness of approximately 3.5 nm is formed by using PS having a molecular weight of 5,000 in the example.

Substrate 1 may be a substrate upon which various metals are laminated on a silicon substrate or a glass substrate. Substrate 1 may include a hard mask layer formed of carbon or silicon that is laminated on surface of an underlying substrate. Substrate 1 may include a chemical guide pattern (e.g., a pattern comprising different surface energies) or a physical guide pattern (e.g., etched grooves or trenches) which may serve to improve or promote the phase arrangement of the first diblock copolymer.

In the example, a silicon substrate subjected to a surface treatment was used, however, if a pattern having a regular arrangement in wider region is to be produced, the substrate having a chemical guide or a physical guide pattern which improves arrangement of the first diblock copolymer may be preferred.

For the first diblock copolymer material a PS-b-PDMS material was used. As a number average molecular weight Mn of each block chain constituting PS-b-PDMS, the PS block chain had 11,800 Mn, the PDMS block chain had 2,700 Mn and a molecular weight distribution Mw/Mn was 1.09. In the PS-b-PDMS material which was used, the volume fraction of PDMS is about 19% and by performing thermal annealing, a sphere pattern of 20 nm pitch in which PDMS becomes the dispersed phase (the spheres) and PS becomes the continuous phase forms after the annealing process.

As noted, PS-b-PDMS which phase-separates into a sphere pattern of 20 nm pitch was used, however the diblock copolymer can be adjusted or process to form other shapes besides spheres. For example a PS-b-PDMS material in which PDMS becomes a columnar polymer phase (a pillar phase) and PS becomes the continuous phase can be used. If the columnar polymer phase is aligned vertically, the pattern density can be increased in the same manner as the previous example. Additionally, different materials other than PS and PDMS may be used to form the diblock copolymer material.

Here, PS-b-PDMS was dissolved in a PGMEA solvent to prepare the first diblock copolymer layer coating solution (first coating solution) having a concentration of 1.5% by weight. The polymer solution was dispensed onto the surface of the substrate to perform a spin coating and the solvent evaporated to form a first diblock copolymer coating layer 3 on the surface of the substrate 1.

In this example, by adjusting the concentration and the number of rotation of a spin coater, a first diblock copolymer layer 3 with a film thickness of 20 nm was obtained.

Then, the substrate 1 on which the first diblock copolymer layer 3 was formed was heat-treated at 170° C. for 20 hours under a vacuum atmosphere and a microphase separation structure in which PDMS became the dispersed phase 4a and PS became the continuous phase 5a was formed. At that time, on the uppermost surface, the surface phase 17 formed of PDMS.

In forming a microphase separation structure, the above-described thermal annealing may be substituted with a solvent annealing in which a sample is placed in a solvent-rich atmosphere having solubility for at least a portion of the diblock copolymer.

First Pattern Forming Step

A first pattern is formed from the generated a microphase separation by using an Induced Coupled Plasma (ICP) RIE device.

First, using carbon tetrafluoride ($CF_4$) as a process gas, the surface phase 17 was etched. The chamber pressure was set to 0.1 Pa, coil RF power and platen RF power were set to 100 W and 2 W respectively, and the etching time was set to 10 seconds.

Then, the continuous phase 5a constituted by PS was etched using oxygen as a process gas. The chamber pressure was set to 0.1 Pa, coil RF power and platen RF power were set to 50 W and 15 W respectively, and the etching time was set to 100 seconds. Thus, as shown in FIG. 1C, a first diblock copolymer pattern 90 including a plurality of the first patterns 6 having the dispersed phase 4b of the first diblock copolymer and the continuous phase 5b modified by etching was formed.

Figure 3A:
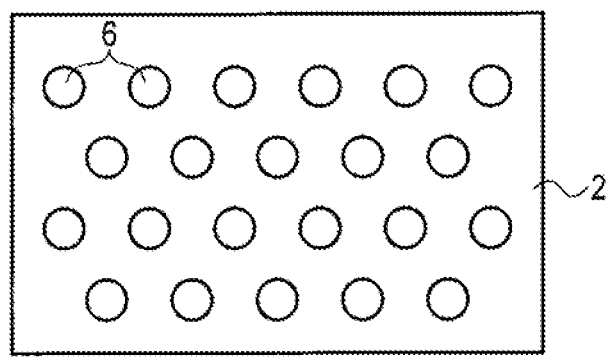
FIGS. 3A to 3C depict a possible pattern arrangement used in the embodiments.
Figure 3B:
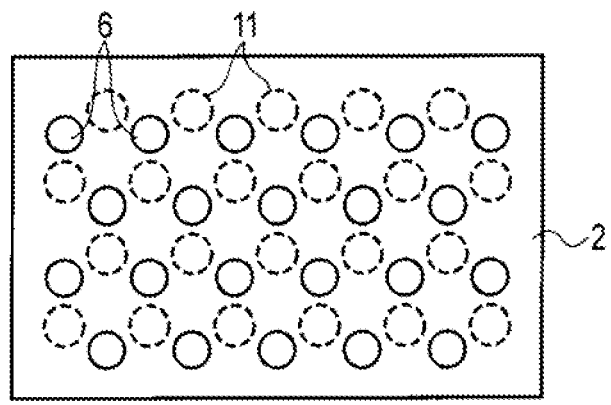
Figure 3C:
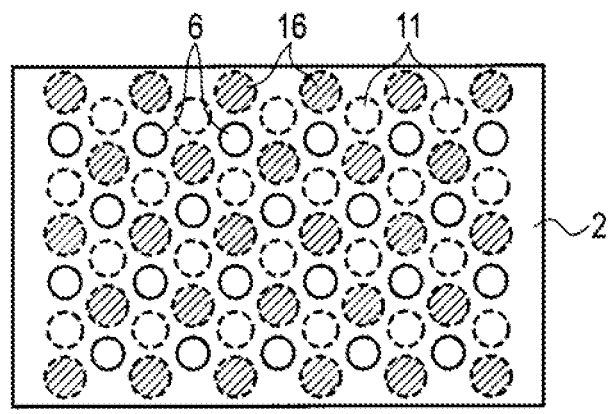

FIGS. 3A to 3C show a schematic diagram for explaining an arrangement of a pattern used in the embodiments.

FIG. 3A corresponds to a top face scanning electron microscope (SEM) image of an etched first diblock copolymer layer 3. The first pattern 6 having a dot shape formed of the dispersed phase 4b of PDMS and the underlying continuous phase 5b is depicted. It was confirmed by experiment that a regular arrangement with a coordination number of 6 in which six first patterns 6 are coordinated around each etched first pattern 6 was formed. Furthermore, it was found that the average of a dot diameter was about 10 nm and the dispersion of the dot diameter was 7%.

By controlling the etching time of the continuous phase 5a constituted with PS, the control of the dot diameter may be adjusted. Specifically, in the above-described etching condition, it was found that the diameter was reduced by 1 nm if etching time is extended by about 10 seconds.

When the height of the first patterns 6 was measured using an atomic force microscope (AFM), it was found that the height of each was about 13 nm.

Second Diblock Copolymer Layer Forming Step and Second Pattern Forming Step

As shown in FIG. 1D, a second diblock copolymer layer 7 was formed using a coating solution prepared in the same manner as the first diblock copolymer coating solution. The film thickness was set to 20 nm, a heat treatment was performed at 170° C. for 20 hours under a vacuum atmosphere, and a microphase separation structure in which PDMS became a dispersed phase 8a and PS became a continuous phase 9a was formed. Furthermore, a PDMS layer 17 having small surface energy forms on the surface of the second diblock copolymer layer 7.

Thereafter, etching was performed for 100 seconds in the same manner as in the first pattern forming step.

Thus, as shown in FIG. 1E, a plurality of the second patterns 11 having an dispersed phase 8b of the first diblock copolymer and the continuous phase 9b modified by etching was formed, and the second diblock copolymer pattern 91 including the first pattern 6 and a second pattern 11 was obtained.

The shape and the arrangement of the pattern were confirmed by a SEM observation. as the SEM observation is depicted in FIG. 3B, it was confirmed that in the second pattern 11, a pattern was formed along the arrangement direction of the first pattern 6.

Since the same diblock copolymer was used, the pitch of the first pattern 6 and the second pattern 11 was the same, respectively, and it is possible to control the orientation of the pattern 11 using the pattern 6. In order to align the orientation, it is necessary to align the pitch of each pattern, and the alignment is necessarily performed within 4% of pitch, in general. When the same diblock copolymer is used, the pattern pitch of the first layer and the second layer can be the same and it is possible to control the pattern orientation.

The average diameter of columns in pattern 91 formed was about 9 nm. It is considered that a narrowing in the first patterns 6 occurs as etching of the second pattern 11 occurs and the diameter is consequently reduced. It was found that dispersion in diameter became 10%.

Third Polymer Layer Forming Step and Third Pattern Forming Step

Using a third diblock copolymer layer coating solution prepared in the same manner as first diblock copolymer layer, a third diblock copolymer layer 13 was formed on the substrate 1 having the first and the second patterns 6 and 11 already formed thereon. The film thickness was set to 20 nm, a heat treatment was performed at 170° C. for 20 hours under a vacuum atmosphere and as shown in FIG. 1F, a microphase separating structure in which PDMS became a dispersed phase 14a and PS became a continuous phase 15a was formed. Furthermore, a PDMS surface layer 17 was formed on the surface.

Thereafter, etching was performed for 100 seconds in the same manner as in the first guide pattern forming step.

Figure 1G:
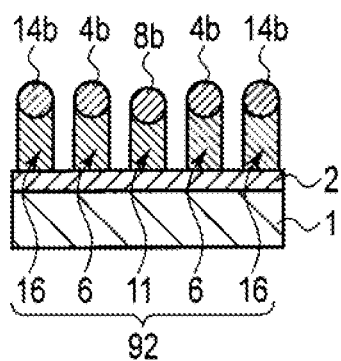

Thus, as shown in FIG. 1G, a pattern 92 formed of the third pattern 16 having the dispersed phase 14b of the third diblock copolymer and the continuous phase 5b modified by etching was formed and the third diblock copolymer pattern 92 formed of the first pattern 6, the second pattern 11 and the third pattern 16 was obtained.

Thereafter, the substrate was evaluated by SEM. A depiction of the SEM result is provided in FIG. 3C, it was found that the third pattern 14 was present along with the first and the second patterns 6 and 11. It was found that the average dot diameter was about 9 nm, and dispersion of the dot diameter was 12%. It is considered that the cause of the increased dispersion was due to the polymer mask being over-etched, causing the difference in dot shape to occur among the first pattern 6, the second pattern 11, and the third pattern 14.

Figure 4A:
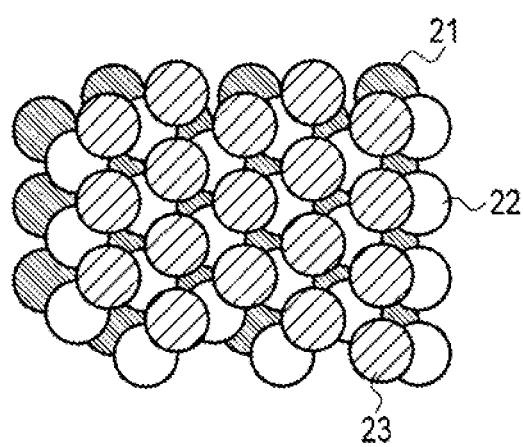
FIGS. 4A and 4B depict a possible pattern arrangement used in the embodiments.
Figure 4B:
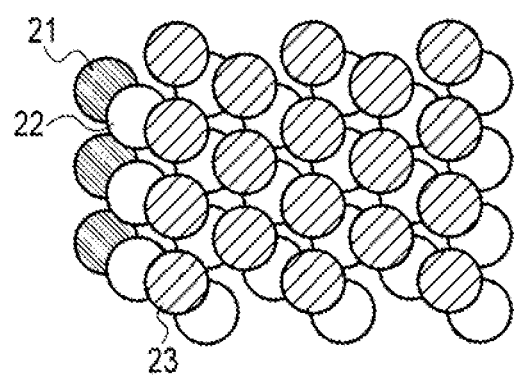

FIGS. 4A and 4B show a schematic diagram representing an example of an arrangement of a diblock copolymer patterns according to an embodiment.

The phase separation pattern obtained by laminating three layers of a diblock copolymer is a face-centered cubic lattice structure (fcc structure) in which phase separation patterns of three dispersed phases 21, 22 and 23 are not layered over one another as depicted in FIG. 4A. Or, as shown in FIG. 4B, a hexagonal close-packed structure (hcp structure) in which the first dispersed phase 21 and the third dispersed phase 23 have the same structure may be formed.

In order to triple the pattern density, it is necessary to form a fcc structure in which three staged phase separation patterns do not overlap each other. By using the first and the second patterns as a guide for arrangement, since the third pattern is formed along the guide, it is possible to control overlapping of patterns in all regions and it is possible to improve a pattern density.

COMPARATIVE EXAMPLE 1

The substrate 1 and the first diblock copolymer layer coating solution, which were each the same as the previous example, were used. The first diblock copolymer layer was formed with a film thickness of 38 nm and a film thickness of 55 nm on the substrate, which was subjected to a surface treatment. Thereafter, a heat treatment was performed at 170° C. for 20 hours and a microphase separation structure in which PDMS became the dispersed phase and PS became a continuous phase was formed.

When film flatness after microphase separation was observed using an optical microscope, in a sample having a film thickness of 38 nm, the film did not cover whole substrate, to cause voids in the film.

Furthermore, in a sample with a film thickness of 55 nm, when excess polymer was used to cover the substrate, the film surface became rough by stress inside the film.

It is considered that the hierarchical structure of film described above which is generated after expressing of a microphase separation structure is because the film thickness of the polymer film is thin and the structure can be improved by adjusting the film thickness to be thicker.

Then, an etching mask pattern was formed in the same manner as in the example 1 described above. The etching time was adjusted to account for the different coating film thickness.

Figure 5A:
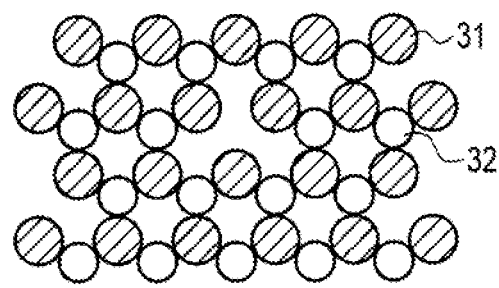
FIGS. 5A and 5B depict a pattern arrangement of diblock copolymer phases in a comparison example.
Figure 5B:
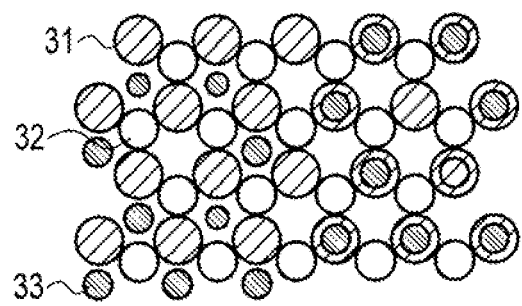

FIGS. 5A and 5B show a schematic diagram representing an example of an arrangement pattern of a diblock copolymer guide of comparative example.

FIG. 5A shows the etching mask pattern of a product having the film thickness of 38 nm and FIG. 5B shows the etching mask pattern of a product having the film thickness of 55 nm.

In the 38 nm products shown in FIG. 5A, a regular structure in which a second diblock copolymer layer 32 was also arranged along a closest-packed regular arrangement of a first diblock copolymer layer 31 was confirmed and regions defected by etching were also confirmed in the dot arrangement of the second diblock copolymer layer 32 were also seen (notice a missing dot in the layer 32 near central portion of the lattice structure).

In the 55 nm product shown in FIG. 5B, the dispersion of the dot size was increased compared to that of 38 nm product. Furthermore, it was found that the each phase separation patterns was divided into a region which has an fcc structure and a region which has an hcp structure.

EXAMPLE 2

FIGS. 6A to 6G show a schematic diagram for explaining other examples of a pattern forming method according to the embodiments.

First Diblock Copolymer Layer Forming Step

A composite substrate 40 in which a carbon layer and a silicon layer were laminated three times on the silicon substrate 1 as a hard mask in which a carbon layer 18-1, a silicon layer 19-1, a carbon layer 18-2, a silicon layer 19-2, a carbon layer 18-3 and a silicon layer 19-3 were included was prepared.

For film formation, a DC (direct current) magnetron sputtering device (C-3010 manufactured by Canon ANELVA) was used. The film thicknesses of the carbon layers and the silicon layers were set to 10 nm and 5 nm respectively. It is preferable that the film thickness of each layer of a hard mask be about half the pitch of the diblock copolymer used, however, the film thickness may be suitably selected depending on the film thickness and material of a chemisorbed layer formed on the substrate surface.

Thereafter, after the substrate was washed for 10 minutes using a UV cleaner, PS having a hydroxyl end group was a coating film was formed by a spin coating.

Thereafter, a heat treatment was performed at 170° C. for 20 hours under a vacuum atmosphere and a chemisorbed layer 2 of PS was formed on the silicon layer 19-3.

Thereafter, the substrate was washed by PGMEA, and excess PS which was not used in chemisorption was dissolved and the substrate was cleaned.

Thereafter, the solvent was evaporated by rotation.

Figure 6A:
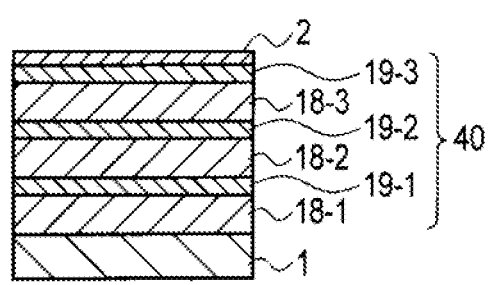
FIGS. 6A to 6G are schematic diagrams depicting a pattern forming method.

As shown in FIG. 6A, the substrate 40 having the chemisorbed layer 2 of PS on the surface was obtained.

As the diblock copolymer, a diblock copolymer (PS-b-PDMS) formed of PS and PDMS was used.

As a number average molecular weight Mn of each block chain constituting PS-b-PDMS, PS block chain had a Mn of 11,800, PDMS block chain had a Mn of 2,700 and a molecular weight distribution Mw/Mn was 1.09. In the PS-b-PDMS material which was used in this example, the volume fraction of PDMS is about 19% and by performing thermal annealing, a sphere pattern of 20 nm pitch in which PDMS became an dispersed phase and PS became a continuous phase was formed.

In the example, PS-b-PDMS material which phase separates into a sphere pattern having a 20 nm pitch was used, however, even in a cylinder pattern in which PDMS became a columnar polymer phase and PS became a continuous phase, if a columnar phase is aligned vertically, the pattern density can be increased in the same manner as the example. Furthermore, even in a diblock copolymer of other materials besides PS-b-PDMS, the same effect can be achieved.

PS-b-PDMS was dissolved in a PGMEA solvent to prepare a coating solution having a concentration of 1.5% PS-b-PDMS by weight. The coating solution was used to form a first diblock copolymer coating layer 3 on the surface of the substrate 40 by a spin coating process. The polymeric concentration of the initially dispensed coating solution and the spin coater rotation speed, can be adjusted to control the coating film thickness. Here, a coating film thickness of 20 nm was obtained for the first diblock copolymer layer 3.

Figure 6B:
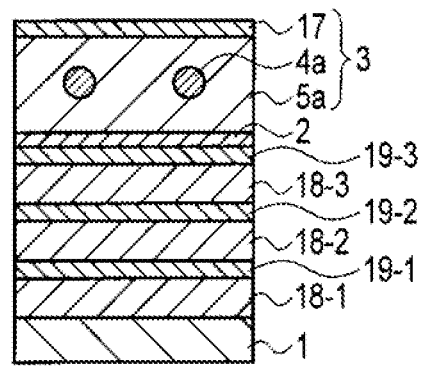

Then, the substrate 40 on which the first diblock copolymer layer 3 was formed was heat-treated at 170° C. for 20 hours under a vacuum atmosphere and as shown in FIG. 6B, a microphase separation structure in which PDMS became the dispersed phase 4a and PS became the continuous phase 5a was. At that time, on the surface of the substrate, the surface phase 17 formed of PDMS having small energy was formed.

In a step of forming a microphase separation structure, the above-described thermal annealing can be substituted with a solvent annealing in which a sample is placed in a solvent atmosphere having the solubility of the diblock copolymer.

First Pattern Manufacturing Step

A patterning process using the microphase separation structure as a mask was performed using Induced Coupled Plasma (ICP) RIE device. First, using $CF_4$ as a process gas, etching of the PDMS layer 17 which was formed on the surface of the first diblock copolymer layer 3 was performed. The chamber pressure was set to 0.1 Pa, coil RF power and platen RF power were set to 100 W and 2 W respectively, and the etching time was set to 10 seconds.

Then, using the dispersed phase 4a as a mask, etching of the continuous phase 5a constituted with PS was performed using oxygen as process gas to form a first pattern 100. The chamber pressure was set to 0.1 Pa, coil RF power and platen RF power were set to 50 W and 15 W respectively, and the etching time was set to 110 seconds.

Figure 6C:
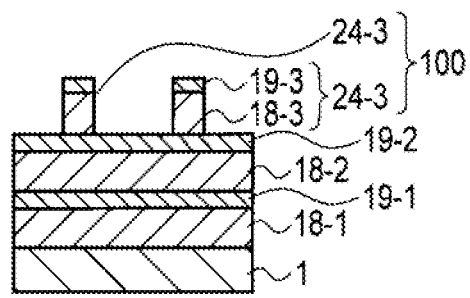

Thereafter, using the first pattern as a mask, a transfer to a hard mask formed of the carbon 18-3 and the silicon 19-3 layers was performed. First, in the pattern transfer to the silicon layer 19-3, $CF_4$ was used as a process gas, the chamber pressure was set to 0.1 Pa, coil RF power and platen RF power were set to 50 W and 5 W respectively, and etching was performed for 32 seconds. Then, etching of the carbon layer 18-3 was performed using the silicon layer 19-3 as a mask. Oxygen was used as a process gas, the chamber pressure was set to 0.1 Pa, coil RF power and platen RF power were set to 100 W and 10 W respectively, and the etching time was set to 15 seconds. Therefore, as shown in FIG. 6C, the first pattern 100 including a plurality of the first hard mask pattern 24-3 in a shape which was formed of laminating of the silicon layer 19-3 and the carbon layer 18-3 which were pattern-processed was obtained.

When the first guide 100 was observed by a top face SEM, it was determine there was a dot diameter of 9 nm and dispersion was 7.5%.

Second Diblock Copolymer Layer Forming Step and Second Pattern Forming Step

PS having a hydroxyl end group was coated on a substrate 40 having the first guide pattern and a coating film was formed by a spin coating.

Thereafter, a heat treatment was performed at 170° C. for 20 hours under a vacuum atmosphere and the chemisorbed layer 2 of PS was formed on the substrate 40.

Thereafter, the substrate was washed by PGMEA, and excess PS which was not used in the chemisorption was dissolved and the substrate was cleaned.

Thereafter, the solvent was evaporated by rotation and the substrate 40 having the chemisorbed layer 2 of PS on the surface was obtained. The dispersed phase is improved with the use of the chemisorbed layer 2 of PS on the surface, but the layer need not always be provided.

Figure 6D:
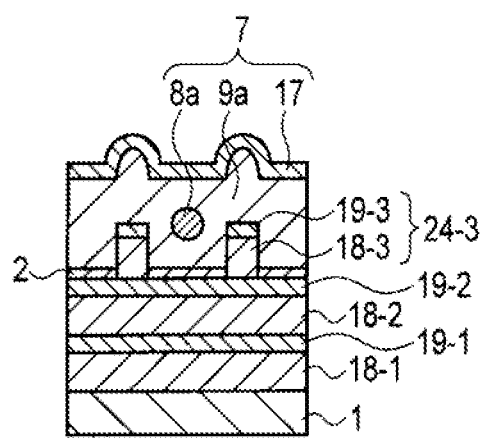

Using the second diblock copolymer layer coating solution, which is the same as the first diblock copolymer layer coating solution, the second diblock copolymer layer 7 was formed on the substrate having a PS chemisorbed layer. The film thickness was set to 20 nm, a heat treatment was performed at 170° C. for 20 hours under a vacuum atmosphere and as shown in FIG. 6D, a microphase separation structure in which PDMS became a dispersed phase 8a and PS became a continuous phase 9a was. Furthermore, PDMS surface layer 17 was formed on the surface.

Figure 6E:
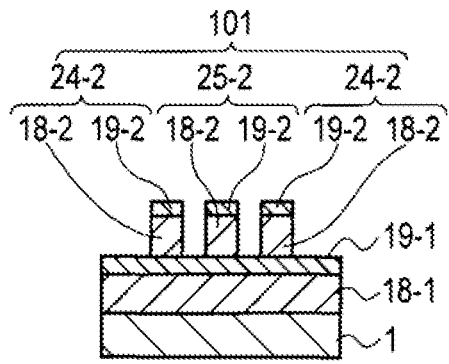

Thereafter, etching was performed for the same time as used in the first pattern forming step and by transferring a dispersed phase 8b of the second diblock copolymer layer 7 and the first hard mask pattern 24-3 to a hard mask formed of the carbon layer 18-2 and the silicon layer 19-2, as shown in FIG. 6E, the second guide 101 formed of a plurality of the second hard mask patterns 25-2 and the first hard mask patterns 24-2 was formed.

When the shape of the obtained second guide pattern 101 was observed by SEM from the top face, it was found that the average diameter is about 9 nm and dispersion is 8.0%. It is considered that a factor by which the change of dispersion from the first guide pattern was small was that by transferring a diblock copolymer to a hard mask, etching resistance was improved and the effect of additional etch process can be reduced.

Third Diblock Copolymer Layer Forming Step and Third Pattern Forming Step

PS having a hydroxyl end group was added coated on the substrate 40 having the first and the second hard mask patterns 24-2 and 25-2 and a coating film was formed by a spin coating. Thereafter, a heat treatment was performed at 170° C. for 20 hours under a vacuum atmosphere and the chemisorbed layer 2 of PS was formed on the substrate. Thereafter, the substrate was washed by PGMEA, excessive PS which was not used in the chemisorption was dissolved and the substrate was cleaned. Thereafter, the solvent was evaporated by rotation and the substrate having a chemisorbed layer of PS on the surface was obtained.

Figure 6F:
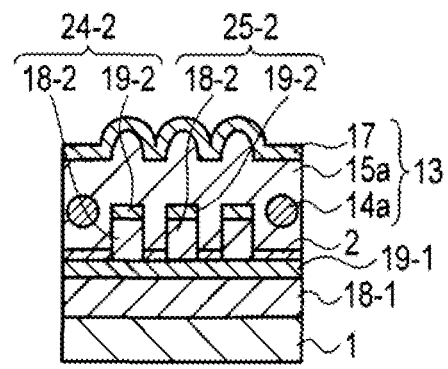

Using a third diblock copolymer layer coating solution, which was the same as the first diblock copolymer layer coating solution, the third diblock copolymer layer 13 was formed on the substrate 40 having a chemisorbed layer 2. The film thickness was set to 20 nm, a heat treatment was performed at 170° C. for 20 hours under a vacuum atmosphere and as shown in FIG. 6F, a microphase separation structure in which PDMS became the dispersed phase 14a and PS became the continuous phase 15a was formed. Furthermore, the PDMS surface layer 17 was formed on the surface.

Thereafter, etching was performed for 100 seconds in the same manner as in the first pattern forming step.

Figure 6G:
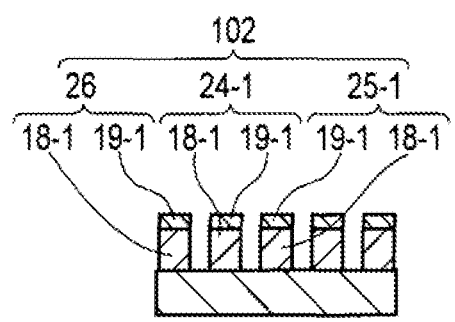

Thus, by transferring an dispersed phase 14 of the third diblock copolymer layer 13, the first hard mask pattern 24-2, and the second hard mask pattern 25-2 to a hard mask formed of the carbon layer 18-1 and the silicon layer 19-1, as shown in FIG. 6G, the third guide pattern 102 formed of a plurality of the second hard mask pattern 25-1, the first hard mask pattern 24-1 and the third hard mask pattern 26-1 was formed.

Thereafter, the shape and arrangement of the pattern were confirmed by SEM observation as the same manner as in the second diblock copolymer layer forming step and the second pattern forming step. It was known that the third hard mask pattern 26-1 was present along with the first and the second hard mask patterns 24-1 and 25-1. Furthermore, when dot shape was evaluated by SEM, the average of dot diameter was about 9 nm, and dispersion of the dot diameter was 8.5%. As a result, it was shown that by transferring pattern to the hard mask, it is possible to suppress the effect of side etching (feature narrowing/trimming) during the transferring step and it is possible to suppress the shape change generated during transferring.

EXAMPLE 3

In an example 3, a polymer the same as example 2 was used and a transfer process of a phase separation (self-assembled) pattern to a magnetic recording medium will be described.

A glass substrate 41 (amorphous substrate MEL6 manufactured by Konica Minolta, diameter is 2.5 inches) was placed in a film formation chamber of a DC magnetron sputter device (C-3010 manufactured by CANNON ANELVA CORPORATION). The inside of the film formation chamber was then evacuated until the degree of vacuum reached $1\times10^{-5}$ Pa. As an adhesive layer (not specifically depicted in the drawings), CrTi of 10 nm was formed on the substrate. Then, a CoFeTaZr film of 40 nm was prepared to form a soft magnetic layer (not specifically depicted in the drawings). A ruthenium (Ru) film of 10 nm was formed as a non-magnetic underlayer (not specifically depicted in the drawings). Thereafter, Co (20 atomic %), Pt (10 atomic %), and Ti film of 10 nm was formed as a perpendicular magnetic recording layer 42. Then, a molybdenum (Mo) film of 5 nm was formed as a release layer 43 and a carbon layer 44 of 30 nm, a silicon layer 45 of 5 nm, a carbon layer of 10 nm, a silicon layer of 5 nm, a carbon layer of 10 nm and a silicon layer of 5 nm were formed on the release layer 43 as a hard mask.

FIGS. 7A to 7D depict a method of manufacturing a magnetic recording medium. A hard mask pattern 102 is formed on the release layer 43 in a manner similar to that described in example 2. Moreover, etching time for forming a hard mask pattern was set to 35 seconds.

Figure 7A:
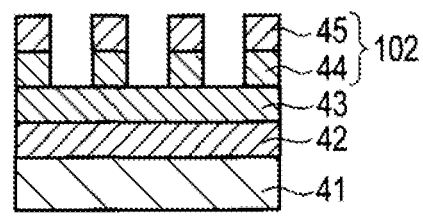
FIGS. 7A to 7D depict a method of manufacturing a magnetic recording medium.
Figure 7B:
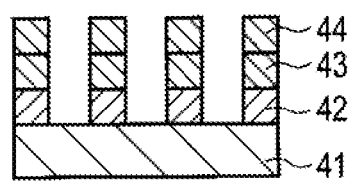
Figure 7C:

Thereafter, as shown in FIG. 7B and FIG. 7C, a milling process of Mo, which is the release layer 43, and a magnetic recording layer 42 was performed by Ar ion milling and the pattern of a hard mask 102 was transferred to the magnetic recording layer 42.

Figure 7D:
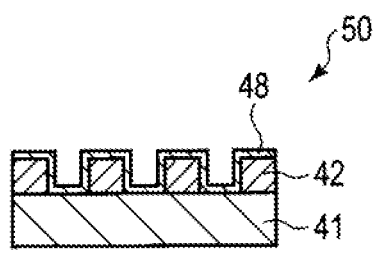

Subsequently, as shown in FIG. 7D, by immersing the substrate in a peeling solution (e.g., a hydrogen peroxide solution), Mo, which is the release layer 43, dissolves and a peel-off (lift-off) process is performed removing layers formed above layer 43. The peeling solution is prepared with $H_2O_2$ 1% by weight and includes a nonionic fluorine-containing surfactant. Peeing-off was performed by immersing the sample.

In this way, a topographic pattern was formed in the magnetic recording layer 42 on the substrate 41.

Thereafter, by forming a protective film 48 and a lubricant film (not specifically depicted in the drawings), a magnetic recording medium 50 was obtained.

As a result of performing an evaluation of the flying characteristic for a head of medium obtained by the above process, error does not occur at a flying height of the head of 5 nm and it was possible to obtain an excellent head flying characteristic.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A patterning method, comprising:
   forming a first copolymer layer on a substrate having a processing layer, the first copolymer layer comprising a first diblock copolymer including two polymeric portions which are phase incompatible with each other;
   annealing the first copolymer layer to thereby generate a first phase pattern in the first copolymer layer, the first phase pattern including a first dispersed phase and a first continuous phase that surrounds the first dispersed phase;
   etching the first copolymer layer to form a first topographic pattern corresponding to the first phase pattern;
   forming a second copolymer layer over the first topographic pattern, the second copolymer layer comprising a second diblock copolymer including two polymeric portions which are phase incompatible with each other;
   annealing the second copolymer layer to thereby generate a second phase pattern in the second copolymer layer, the second phase pattern offset from the first topographic pattern in a direction parallel to the substrate and including a second dispersed phase and a second continuous phase that surrounds the second dispersed phase;
   etching the second copolymer layer to form a second topographic pattern corresponding to the second phase pattern; and
   transferring the first and second topographic patterns to the processing layer.

2. The method of claim 1, further comprising:
   forming a third copolymer layer over the second topographic pattern, the third copolymer layer comprising a third diblock copolymer including two polymeric portions which are phase incompatible with each other;
   annealing the third copolymer layer to thereby generate a third phase pattern in the third copolymer layer, the third phase pattern offset from the first and second topographic patterns in the direction parallel to the substrate and including a third dispersed phase and a third continuous phase that surrounds the third dispersed phase;
   etching the third copolymer layer to form a third topographic pattern corresponding to the third phase pattern; and
   transferring the third topographic pattern to the processing layer.

3. The method of claim 2, wherein the first, second, and third topographic patterns are transferred to the processing layer at the same time.

4. The method of claim 2, wherein the first, second, and third diblock copolymers each comprise a same polymeric material.

5. The method of claim 2, further comprising:
   forming a first hard mask layer on the processing layer;
   forming a second hard mask layer on the first hard mask layer; and
   forming a third hard mask layer on the second hard mask layer, wherein the first copolymer layer is formed on the third hard mask layer.

6. The method of claim 5, wherein the first topographic pattern is transferred to the third hard mask before the second copolymer layer is formed.

7. The method of claim 5, wherein the second topographic pattern is transferred to the second hard mask before the third copolymer layer is formed.

8. The method of claim 1, wherein a surface modification layer is formed on the substrate before the first copolymer layer is formed.

9. The method of claim 8, wherein the surface modification film is a polystyrene film that is chemisorbed on the substrate.

10. The method of claim 1, further comprising:
    forming a hard mask layer on the processing layer before forming the first copolymer layer.

11. The method of claim 10, wherein the hard mask layer comprises a carbon layer and a silicon layer.

12. The method of claim 11, wherein a combined thickness of the carbon layer and the silicon is approximately one-half of a pitch of the first phase pattern.

13. The method of claim 1, wherein the first phase pattern appears to comprise an array of dots when viewed from a direction perpendicular to the substrate plane.

14. The method of claim 13, wherein a diameter of dots in the array of dots is $1/\sqrt{3}$ of a pitch of the array of dots.

15. The method of claim 1, wherein the first and second diblock copolymers each comprise polystyrene-polydimethylsiloxane (PS-PDMS).

16. The method of claim 1, wherein at least one annealing step is a solvent annealing process.

17. A patterning method, comprising:
forming a first layer on a substrate including a processing layer, the first layer including a first diblock copolymer that can phase separate to form a first phase pattern comprising a first dispersed phase surrounded by a first continuous phase, the first phase pattern, when viewed in a direction perpendicular to a substrate plane, comprising a first array of dots;
forming the first phase pattern by annealing the first layer;
etching the first layer to remove a portion of the first continuous phase to thereby form a first topographic pattern corresponding to the first phase pattern;
forming a second layer over the first topographic pattern, the second layer including a second diblock copolymer that can phase separate to form a second phase pattern comprising a second dispersed phase surrounded by a second continuous phase, the second phase pattern, when viewed in the direction perpendicular to the substrate plane, comprising a second array of dots that is offset from the first array of dots in a direction parallel to the substrate plane;
forming the second phase pattern by annealing the second layer; and
etching the second layer to remove a portion of the second continuous phase to thereby form a second topographic pattern corresponding to the second phase pattern.

18. The method of claim 17, further comprising:
transferring the first and second topographic patterns to the processing layer.

19. The method of claim 18, wherein the processing layer is a magnetic recording layer.

20. A method of patterning, comprising:
forming a processing layer on a substrate;
forming a first hard mask layer on the processing layer;
forming a second hard mask layer on the first hard mask layer;
forming a third hard mask layer on the second hard mask layer;
forming a first copolymer layer on the first surface modification layer, the first copolymer layer comprising a first diblock copolymer including two polymeric portions which are phase incompatible with each other;
annealing the first copolymer layer to thereby generate a first phase pattern in the first copolymer layer, the first phase pattern including a first dispersed phase and a first continuous phase that surrounds the first dispersed phase;
etching the first copolymer layer to form a first topographic pattern corresponding to the first phase pattern;
transferring the first topographic pattern to the third hard mask layer to form a first hard mask pattern;
forming a second copolymer layer over the first hard mask pattern, the second copolymer layer comprising a second diblock copolymer including two polymeric portions which are phase incompatible with each other;
annealing the second copolymer layer to thereby generate a second phase pattern in the second copolymer layer, the second phase pattern being offset from the first hard mask pattern in a direction parallel to a substrate plane and including a second dispersed phase and a second continuous phase that surrounds the second dispersed phase;
etching the second copolymer layer to form a second topographic pattern corresponding to the second phase pattern;
transferring the second topographic pattern to the second hard mask layer to form a second hard mask pattern;
forming a third copolymer layer over the second hard mask pattern, the third copolymer layer comprising a third diblock copolymer including two polymeric portions which are phase incompatible with each other;
annealing the third copolymer layer to thereby generate a third phase pattern in the third copolymer layer, the third phase pattern being offset from the first and second hard mask patterns in the direction parallel to the substrate plane and including a third dispersed phase and a third continuous phase that surrounds the third dispersed phase;
etching the third copolymer layer to form a third topographic pattern corresponding to the third phase pattern;
transferring the third topographic pattern to the first hard mask layer to form a third hard mask pattern; and
transferring the first, second, and third hard mask patterns to the processing layer at a same time.

* * * * *